US010378494B2

(12) United States Patent
Jokschas et al.

(10) Patent No.: US 10,378,494 B2

(45) **Date of Patent: *Aug. 13, 2019**

(54) FILTER ELEMENT

(71) Applicant: MANN+HUMMEL GmbH, Ludwigsburg (DE)

(72) Inventors: Guenter Jokschas, Murrhardt (DE); Martin Weindorf, Kornwestheim (DE); Martin Veit, Gaertringen (DE); Rafael Salom, Remseck (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,932

(22) Filed: Oct. 23, 2018

(65) Prior Publication Data

US 2019/0162140 A1 May 30, 2019

Related U.S. Application Data

(63) Continuation of application No. 14/953,273, filed on Nov. 27, 2015, now Pat. No. 10,132,279, which is a (Continued)

(30) Foreign Application Priority Data

May 28, 2013 (DE) ........................ 10 2013 008 987
Dec. 12, 2013 (DE) ........................ 10 2013 020 539

(51) Int. Cl.
*F02M 37/22* (2019.01)
*B01D 35/00* (2006.01)
(Continued)

(52) U.S. Cl.
CPC ............. *F02M 37/22* (2013.01); *B01D 29/15* (2013.01); *B01D 29/21* (2013.01); *B01D 35/005* (2013.01); *B01D 35/153* (2013.01); *B01D 36/001* (2013.01); *F02M 37/24* (2019.01); *B01D 2201/0415* (2013.01); *B01D 2201/295* (2013.01); *B01D 2201/305* (2013.01); *B01D 2201/316* (2013.01)

(58) Field of Classification Search
CPC ...... B01D 36/001; B01D 36/00; B01D 29/15; B01D 29/21; B01D 35/00; B01D 35/005; B01D 35/153; B01D 2201/0415; B01D 2201/295; B01D 2201/305; B01D 2201/316; F02M 37/221; F02M 37/22
USPC .......................................................... 210/136
See application file for complete search history.

(56) References Cited

U.S. PATENT DOCUMENTS

2008/0272046 A1* 11/2008 Lampert ................ B01D 29/21 210/312
2011/0036770 A1* 2/2011 Jokschas ................ B01D 29/21 210/440

* cited by examiner

*Primary Examiner* — Robert Clemente
*Assistant Examiner* — Akash K Varma
(74) *Attorney, Agent, or Firm* — James Hasselbeck

(57) ABSTRACT

The invention relates to a filter element (10) having a first fluid path (12) on a raw side (60) for filtering a first fluid (64) and a second fluid path (14) having a fluid line (16) on a clean side (62) for carrying a second fluid (66). The filter element (10) is provided at least on one side with a first end plate (20). Here, the fluid line (16) is arranged in the central inner region (36) of the filter element (10) and connected with the end plate (20) for joint disassembly, especially securely connected to the filter element. The invention further relates to a filter system (100) including such a filter element (10).

13 Claims, 14 Drawing Sheets

Related U.S. Application Data continuation of application No. PCT/EP2014/061117, filed on May 28, 2014.

(51) Int. Cl.

| | |
|---|---|
| ***B01D 29/15*** | (2006.01) |
| ***B01D 36/00*** | (2006.01) |
| ***B01D 35/153*** | (2006.01) |
| ***B01D 29/21*** | (2006.01) |
| ***F02M 37/24*** | (2019.01) |

FILTER ELEMENT

CROSS-REFERENCE TO RELATED APPLICATIONS

This application is a continuation of application Ser. No. 14/953,273, filed 27 Nov. 2015 which is a continuation of international application No. PCT/EP2014/061117, having an international filing date of 28 May 2014 and designating the United States, the international application claiming a priority date of 28 May 2013, based on prior filed German patent application No. 10 2013 008 987.5, and the international application claiming a priority date of 12 Dec. 2013, based on prior filed German patent application No. 10 2013 020 539.5. The entire contents of the aforesaid US application, the aforesaid international application and the aforesaid German patent applications being incorporated herein by reference.

TECHNICAL FIELD

The invention relates to a filter element for filtering a fluid and a filter system including said filter element, in particular a fuel filter of a motor vehicle.

BACKGROUND

During the operation of a fluid filter, for example as a fuel filter for diesel fuel, air bubbles are to be avoided, which could be conveyed to the internal combustion engine. At the beginning of the liquid feed into an outer chamber of a filter arrangement, a certain amount of air upstream from the liquid is transported into the outer chamber. This amount of air is likewise pressed by the subsequent pressure of the liquid through the filter insert and thus also reaches the outlet of the filter arrangement. This is very disadvantageous, in particular in use as a fuel filter, because the downstream units, such as an internal combustion engine, can be hindered during operation by air pockets in the fuel supply.

For this reason, a vent should be provided in the fluid filter. By means of this vent, and in particular by means of a bore provided thereby, which is also designated as a ventilation nozzle, however there also results a permanent volume flow loss of fuel, which is conveyed directly back into the tank along with the air bubbles. In practice, for example, holes with diameters up to 0.7 mm are typical. However, the volume flow loss through these comparatively large bores should be minimized.

EP 1 356 199 B1 therefore proposes connecting two ventilation nozzles in series, i.e. providing two bores, which are arranged in series in the flow direction of the air bubbles and the fuel flow loss. The ventilating function is realized via a tube fixed on the filter housing having a first bore, which serves to receive the filter element, which is closed with a lid with two bores. In the ventilating function, both ventilation nozzles are thereby connected in series. In this way, an increased resistance for the liquid results in comparison with use of only one equally large ventilation nozzle. This increased resistance could be achieved in the use of only one ventilation nozzle through a reduction of the diameter of the bore, wherein, however, this may be costly from a manufacturing perspective and additionally may entail the risk that the especially small bore clogs quickly, so that the ventilating function is no longer provided.

BRIEF SUMMARY

An object of the invention is therefore to design a filter element such that a ventilation of a tank system may be represented in a simple and reliable manner.

A further object of the invention is to provide a filter system for receiving such a replaceable filter element, which may represent a ventilation of a tank system in a simple and reliable manner.

The aforementioned objects are achieved according to one aspect of the invention of a filter element having a first fluid path on a raw side for filtering a first fluid and a second fluid path having a fluid line on a clean side for carrying a second fluid, in that the fluid line is arranged centrally in the inner region of the filter element and is connected to the end plate for joint disassembly, especially securely connected to the filter element.

According to another aspect of the invention, the object is achieved by a filter system including said filter element, wherein the filter element is replaceably arranged in a filter housing of the filter system and provides a receptacle for a fluid line and/or a receptacle for a non-return valve.

Advantageous embodiments and advantages of the invention result from the additional claims, the description and the drawings.

A filter element is proposed having a first fluid path on a raw side for filtering a first fluid and a second fluid path having a fluid line on a clean side for carrying a second fluid, on which filter element is provided at least one end with a first end plate, wherein the fluid line is arranged centrally in the inner region of the filter element and is connected to the end plate for joint disassembly, especially securely connected to the filter element.

In the case of a preferred embodiment, the end plate has a bore such that the fluid line is connected via the bore with an outer region of the filter element.

Consequently, the filter element comprise the fluid line of the second fluid path. The fluid line is replaceable with the filter element. In particular, it is undetachably connected to the (rest of) the filter element. The element-side fluid line can therefore also be configured so as to be fixed to the element. The fluid line is preferably an integral component of the filter element. In particular, a non-destructive separation of the fluid line from the (rest of) the filter element cannot occur.

The element-side fluid line may preferably be formed as a rigid tube, which contributes to the stability of the filter element.

In the installed state of the filter element, the element-side fluid line advantageously opens above a filter body, so that, for example, fuel flows through the fluid line only when the filter body is supplied completely with fuel, i.e. the air is displaced from the fuel filter so far that the fuel level extends above the filter body.

A variant is particularly preferred in which the fluid line leads from one end face of the filter element, in particular the upper end face of an installed filter element, to the opposite (lower) end face. In this way, a discharge of the air from the filter may occur in a convenient manner via the housing bottom.

A particularly compact design is obtained in that the fluid line extends through an inner region surrounded by the filter body. For example, the filter body has a filter media web, preferably a star-pleated filter media web, for particle filtration. A coalescer, for example from a wound coalescer medium, is preferably provided within the filter media web. A water separating element, for example with a hydrophobic mesh fabric, follows the coalescer medium in the direction of flow, which water separating element is arranged for example within the coalescer medium and at the height thereof. An annular water discharge gap is formed between the coalescer medium and the water separating element. The fluid line is guided through the inner region surrounded by the water separating element.

The fluid line and the water separating element may preferably form a structural unit.

In a particularly preferred variant, the filter element is provided with an inflow port, by means of which the element-side fluid line can be connected, for example to a valve and/or throttle unit, such as a non-return valve, during installation of the filter element in the housing of the filter system. This variant makes it possible, for example, to arrange the non-return valve on the housing side. Thus, it need be not replaced when changing the filter element.

A particularly robust construction of an inflow port results, for example, through a design as a stub-shaped protrusion of the fluid line. An inflow port designed as a stub-shaped protrusion can also be easily arranged above the rest of the filter element, in particular above the filter body. It preferably protrudes at one end face of the filter element, in particular the upper end face.

For the purpose of ease of assembly of the filter element, the inflow port is arranged coaxially to a longitudinal element axis. Thanks to this measure, the filter element can be installed in any rotational position about its longitudinal element axis.

In a particularly preferred embodiment, the inflow port is provided with a sealing element for sealing engagement with a housing component, such as a non-return valve. Straight sealing elements are subject to considerable wear, so it is advantageous to provide the sealing element on the inflow port, which is regularly replaced along with the filter element.

Advantageous sealing behavior and installation forces arise in that the sealing element is preferably formed as a circumferential sealing element directed radially outward. An O-ring applied to the element-side connection stub has proven useful in practice.

The filter element may further comprise an outflow port, by means of which the element-side fluid line can be connected to a housing-side outflow channel during installation of the filter element in the housing of the filter system. The outflow port may preferably be designed such that it contributes to the holding and support of the filter element in the housing. The housing-side outflow channel is preferably connected to a tank return.

A particularly robust construction results through a design of the outflow port as a stub-shaped protrusion of the fluid line.

Comparable to the conditions of the non-return valve port, the outflow port may also be provided with a sealing element for sealing engagement on the housing-side outflow channel, which is, in particular, a circumferential sealing element directed radially outward. An O-ring applied on the outflow-side connection stub can be regarded as a proven example.

For assembly reasons, a coaxial arrangement of the outflow port to a longitudinal element axis is advantageous.

In a particularly preferred embodiment, the filter element has two circumferential seals in the region of that end face which is arranged below in the installed state of the filter element. For example, in a fuel filter with a clean-side water separation, these seals may be used to seal a raw fluid-side annular space, which surrounds the filter element, from a clean fluid-side water collection area below the filter element. Two seals are provided in order to control the outflow of fuel from the raw fluid-side annular space during removal of the filter element such that a contamination of the clean-side water collection area with raw fluid from the outer annular space is avoided or at least reduced. In particular, one of the seals is used for sealing the raw fluid-side annular space against an emptying area. The other seal is used for sealing the emptying area against the clean-side water collection area. During disassembly of the filter element, the first seal loses its sealing engagement with the housing temporally before the second seal. The emptying area is preferably connected to a tank return.

In a particularly preferred variant, the two sealing elements are arranged in the region of that end face on which the outflow port of the element-side fluid line is also provided.

For the purpose of lower assembly forces and a compact construction, at least one of the seals is oriented radially outward and/or at least one of the seals is oriented radially inward. The two seals are preferably of different diameters and/or are arranged coaxially to each other.

In a particularly preferred embodiment, the filter element has a clean fluid outlet in the region of that end face on which the outflow port is arranged. The various ports may thus be advantageously integrated into the housing container.

A further advantageous measure for avoiding the contamination of the clean side of the filter with unfiltered fluid is obtained in that the clean fluid outlet is provided with a stub-shaped protrusion, which preferably surrounds the outflow port.

In one embodiment, in which the filter element is designed as a fuel filter and has a water separation, a water outlet is preferably provided for water separated from the first fluid (fuel) in the region of that end side on which the outflow port is arranged. A mixing of the separated water with the filtered fuel is thus avoided, in that the water outlet surrounds the stub-shaped protrusion which surrounds the clean fluid outlet.

Alternatively or in addition to a variant with a housing-side non-return valve, a non-return valve is fixed on the fluid line, which is preferably firmly attached to the element. A construction in which the non-return valve is integrated into the fluid line is particularly compact.

According to the invention, a venting of a filter system occurs via the filter element itself. In the inner region of the filter element is located a fluid line as a ventilation channel, which is preferably formed as a tube. The fluid line is connected with the first end plate, in which a small bore is integrated. Through this bore, the air in the filter system may be removed through the filter element, for example during start-up. The vent is thus completely separated from the clean side. During start-up of a filter system, the second fluid, and thus typically air, are in the fluid line, while during operation, the fluid line is filled with the first fluid, thus for example fuel, of the raw side.

By means of a vent in or through the filter element, significantly simpler solutions for a filter housing can be represented. Costly machining of the filter housing can thus be eliminated, and the function of a filter system can be ensured with fewer parts in comparison with solutions in which a ventilation is effected via a ventilation channel arranged in the filter housing. The fluid line is arranged here such that it can be removed together with the filter element, as it is in particular fixedly connected thereto.

Advantageously, the fluid line of the second fluid may be arranged in a support tube which is connected with the end plate and which extends beyond at least a first end plate and/or a second end plate. An additional ventilation channel can thus be avoided, and the support tube, which is fixedly connected with the first end plate and which may alternatively have additional fastening elements to the filter body, may thus serve to further stiffen the filter element. The installation of the filter element in the filter housing, and the cover with the non-return valve provided therein, which can be attached on the fluid line, can be simplified in that the fluid line extends beyond the end plates.

A non-return valve may advantageously be arranged in the second fluid path, which non-return valve closes the second fluid path. The non-return valve preferably closes the second fluid path when a predetermined system lower pressure limit is not met. In particular when the predetermined system lower pressure limit is not met on the raw side of the filter, which occurs in particular when an internal combustion engine is switched off, whereby a flow of the first fluid through the filter element is interrupted.

Typically desired continuous ventilations of a filter element of an internal combustion engine may thus be equipped with a non-return valve. In this way, fuel can be retained in an internal combustion engine which is turned off, for example in start/stop operation, and it can be prevented that any air which is possible in a tank return line enters the fuel management system of the internal combustion engine via the filter system. When the internal combustion engine is not running, the ventilation of the filter element may remain closed. If the internal combustion engine is started, and in start/stop operation a very short engine start time is typically desirable, the necessary system pressure in the fuel management system for an ignition release can be built up immediately in the fuel system. The system pressure which builds up in an outer region of the filter element enables an opening of the non-return valve and the filter element can once again be continuously ventilated. The great advantage is thus that short motor start times are made possible, in that the fuel remains in the filter system.

A further advantageous design possibility is to design the filter element such that a non-return valve is alternatively or additionally arranged within the fluid line and sealed to the fluid line with a concentric seal, wherein the seal is in particular arranged for joint disassembly with the filter element. A molded seal fixedly connected with the fluid line may preferably be used for this seal. The fluid line, which can in particular be realized in a central support tube of the filter element, may thus be directly connected with the non-return valve, which can reduce the number of components and further simplify installation. If the seal is disassembled together with the filter element, it is thus ensured that it is also changed when the filter element is changed, and a seal which is used and may no longer be secure is not used further after changing of the filter element.

An advantageous embodiment of the filter element further provides that the non-return valve can be fixed, in particular fluid-tight, with a snap connection. A sealing of the fluid line can thereby be realized, for example, by means of an O-ring seal. The non-return valve, which can be advantageously arranged in a valve support in this embodiment, can thus be easily inserted during assembly. The end plate of the filter element may hold the non-return valve in place by means of the snap connection. Alternatively, the non-return valve may be held via a housing cover of the filter system, likewise by means of the snap connection. In addition, the non-return valve can easily be exchanged by means of such an arrangement, which is sealed by means of an O-ring seal, in case of failure of the non-return valve.

Conveniently, the non-return valve may be mounted in an upper housing part of a filter housing, wherein the fluid line may be accessible through the end plate and the non-return valve may be arranged above or in the end plate. In this way, a simple installation and also possible interchangeability of the non-return valve is provided in case of failure.

Advantageously, the filter element may have a hollow cylindrical design, and the first fluid path may lead radially through a filter body of the hollow cylindrical filter element. The first fluid path may advantageously lead radially from an outer region into an inner region in the filter element. This arrangement allows an inflow of fuel from the outside, for example, across the circumference of the filter element, through the filter medium, for example star-pleated filter medium, of the filter body. The fuel may then flow through the filter element to the inside and may be lead via the inner region of the filter element into the fuel supply of an internal combustion engine.

Advantageously, the filter element may be provided with a second end plate on a side opposite the first end plate, wherein the fluid line may be connected with the second end plate. In this way, an effective structural stiffening of the filter element and the fluid line may be represented with minimal effort.

In an advantageous embodiment, the fluid line may be sealed during installation in a filter housing with a seal, for example an O-ring seal or some other molded seal. This ensures that the ventilation line is completely separated from the clean side of the filter system. A simpler and faster changing of the filter element in the case of maintenance is further provided, in that the fluid line can simple be pulled out of its receptacle in the filter housing.

The fluid line may advantageously be provided with a drain device for separation of the first and second fluids during disassembly of the filter element from a filter housing. An ingress of the first fluid into the receptacle of the fluid line in the filter housing and thereby into the second fluid path is thereby effectively prevented while changing the filter element during maintenance.

In an advantageous embodiment, the filter element can be sealed—as already indicated—with at least two seals, for example O-ring seals or other molded seals, for separating the contaminated side and clean side of the first fluid path during disassembly of the filter element from the filter housing, wherein during according assembly in a filter system, the filter element is connected with a filter housing to be coupled via a quick coupling arranged on the first end plate. In that the O-ring seal maintains its sealing function until the first fluid has drained on the contaminated side, for example by means of a drain channel, it is prevented that a portion of the first fluid can travel from the contaminated side to the clean side of the fluid system and thus contaminate the fuel system of an internal combustion engine. An upper housing part may be reliably and quickly connected with the filter element by means of the quick coupling, for example a bayonet connection, and thus sealingly close the filter system. A secure deinstallation of the filter element is also provided in this way, as in this manner the filter element can be removed from the filter housing with the upper housing part.

Advantageously, the filter element may be provided with a water separating device, which comprises a so-called coalescer, which is arranged concentrically about the fluid line on a clean side of the filter element, as well as an end separator, which is arranged concentrically about the fluid line between the coalescer and the fluid line. Fuel as the first fluid, for example, may contain a certain amount of water, which can cause damage to the injection system of an internal combustion engine. To prevent this, the contained water may be separated and flow separately away from the fuel on the clean side of the filter system, for instance by means of an air swirler, wherein the first fluid is here set in rotation and the water is thus separated from the fuel via the differing specific gravity of the water. The coalescer is alternatively used for the agglomeration of small water droplets into large water drops, which may then be collected and drained at an end separator due to gravity. The coalescer, the geometry of the sedimentation space of the water droplets and the end separator act together during water separation to form the water separating device.

Advantageously, the first fluid path may be used for filtering fuel. Alternatively, the use of such a configuration is conceivable for other liquid fluids which must be filtered. Of course, such filter systems for other liquid fluids are typically provided with ventilation systems, so that the use of the proposed ventilation function is also conceivable in the filtering of other fluids.

The invention relates, according to another aspect, to a filter system including said filter element, wherein the filter element may be replaceably arranged in a filter housing of the filter system, which filter system may provide a receptacle for a fluid line and/or a receptacle for a non-return valve. As filter elements of a filter system in the raw fluid area, i.e. in the area of unfiltered fluid, typically must be replaced at regular maintenance intervals, it is expedient if the filter element is provided to be replaceable.

Advantageously in such a filter system, typically desired continuous ventilations of the filter system of an internal combustion engine may thus be equipped with a non-return valve. In this way, fuel can be retained in an internal combustion engine which is turned off, for example in start/stop operation, and it can be prevented that any air which is possible in a tank return line enters the fuel management system of the internal combustion engine via the filter system. When the internal combustion engine is not running, the ventilation of the filter system may remain closed. If the internal combustion engine is started, and in start/stop operation a very short engine start time is typically desirable, the necessary system pressure in the fuel management system for an ignition release can be built up immediately in the fuel system. The system pressure enables an opening of the non-return valve and the filter system can once again be continuously ventilated. The great advantage is thus that short motor start times are made possible, in that the fuel remains in the filter system.

In an advantageous embodiment, the filter system may be provided such that the second fluid path of the filter element is provided for ventilating a fuel management system of an internal combustion engine. Especially in internal combustion engines, in which the starting process should take place in a relatively short time, as is the case in modern internal combustion engines in start/stop operation, such a ventilation system is of great advantage, as it retains the fluid in the filter system when the internal combustion engine is turned off and thus enables short start times.

BRIEF DESCRIPTION OF THE DRAWINGS

Further advantages appear from the following description of drawings. The drawings illustrate exemplary embodiments of the invention. The drawings, description and claims contain numerous features in combination. A person skilled in the art will expediently also consider the features individually and combine them into appropriate further combinations.

DETAILED DESCRIPTION

Figure 1:
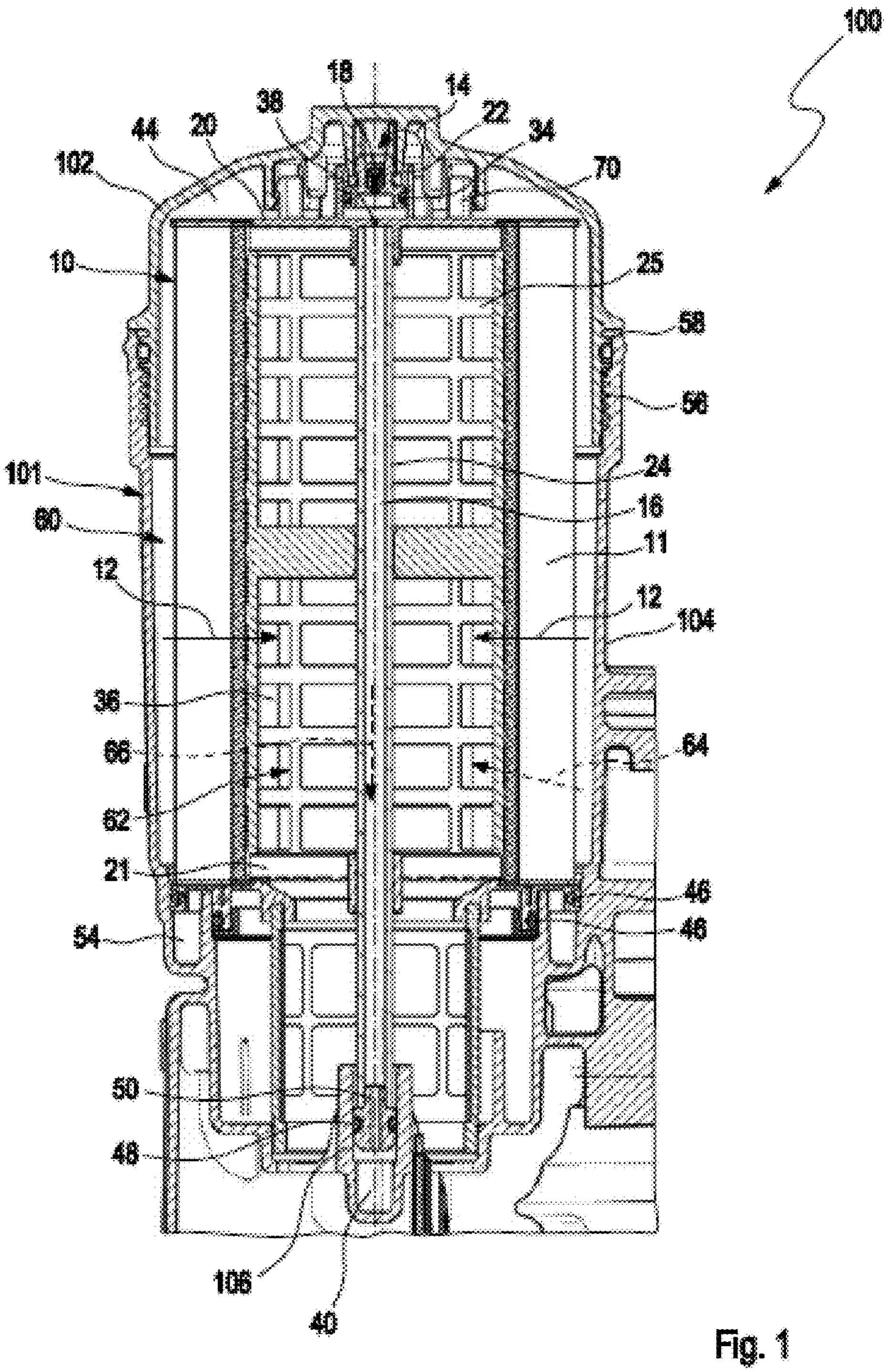
FIG. 1 shows a longitudinal section through a filter system according to one embodiment of the invention for fuel filtration in a motor vehicle.

In the figures, identical or similar components are provided with the same reference characters. The figures are only exemplary and are not meant to be limiting.

The invention is illustrated with reference to a fuel filter, however it may also be provided for other filter systems with corresponding adaptation of the construction.

FIG. 1 shows a longitudinal section through a filter system 100 according to one embodiment of the invention for fuel filtration in a motor vehicle. The filter element 100 has a filter element 10 having a first fluid path 12 for filtering a first fluid 64 from a raw side 60 to a clean side 62 and a second fluid path 14 having a fluid line 16 through a clean side 62 for carrying a second fluid 66 which is connected with the raw side 60, which filter element 10 is provided with a first end plate 20, wherein the fluid line 16 is arranged centrally in the inner region 36 of the filter element 10 and is connected to the end plate 20 for joint disassembly, especially securely connected to the filter element, and the end plate 20 has a bore 38 which is designed such that the fluid line 16 is connected via the bore 38 with an outer region 44 on the raw side 60 of the filter element 10.

During start-up of the filter system 100, the second fluid 66, and thus typically air, are in the fluid line 16, while during operation, the fluid line 16 is filled with the first fluid 64, thus for example fuel, of the raw side 60.

The filter system 100 comprises a central filter housing 101 in two parts, an upper housing part 102 and a lower housing part 104. The upper housing part 102 may be connected here via a screw connection 56 with the lower housing part 104, and be fixed via an inner O-ring seal 58. A hollow cylindrical filter element 10 sits centrally arranged in the filter housing 101, through which correspondingly flows a first fluid 64, in particular fuel, radially from the outer region 44 into an inner region 36 by means of the first fluid path 12, marked by an arrow, said fluid thereby being filtered. The filtering takes place here in the filter body 11 of the hollow cylindrical filter element 10.

In an embodiment not shown, a reverse direction of flow from inside to outside is also conceivable with a corresponding adjustment of the positions of the respective components.

The filter element 10 is connected via a quick coupling 70 in the form of a snap connection with the upper housing part 102, and can thus be pulled out with the unscrewed upper housing part 102 from the lower housing part 104, for example during a change of the filter element 10 for maintenance.

The filter body 11 itself preferably consists of folded filter paper and can be designed to be replaceable. The filter body 11 is stiffened on its inner side by means of a central tube 25, whereby a collapse pressure resistance of the filter body 11 is realized. The filter system 100 can be opened for replacement, for example, via the two-part filter housing 101. The filter element 10 is sealed against the lower housing part 104 with two O-ring seals 46, and in this way separates the outer region 44 from the inner region 36 of the first fluid path, i.e. the raw side 60 from the clean side 62 of the filter system 100. The filtered fluid 64 flows downward via the inner region 36 of the filter element 10 and is conveyed further, for example to the injection system of an internal combustion engine. After removal of the upper housing part 102, the filter element 10 can be pulled out upward, whereby, by means of the arrangement of the two O-ring seals 46, the first fluid 64 still located on the raw side 60 in the outer region 44 of the filter system 100 may drain via an emptying channel 54 and may not enter the clean side 62, i.e. the inner region 36 of the filter element 10 and thus the internal combustion engine. A first end plate 20 is mounted on the upper end of the filter element 10, said cover being flatly and sealingly applied on the filter element 10 and to which cover is adjoined a fluid line 16 in the inner region 36 of the filter element. The fluid line 16 is inserted at the lower end with an O-ring seal 48 into a receptacle 106 of the lower housing part 104. A drain device 50 is likewise mounted on the lower end of the fluid line 16, which, during a replacement of the filter element 10, protects the clean side 62 of the tank system from contamination by separating the first 64 and second fluid 66. A non-return valve 18 is centrally arranged in the upper end plate 20, which non-return valve can be fixed on the upper end plate 20 and/or on the upper housing part 102 via a snap connection 22 and which is sealed against the upper end plate 20 via an O-ring seal 34. The non-return valve 18 is expediently designed as a minimum pressure valve with a non-return function and an opening pressure on the order of 0.4 bar, and is usually always open during operation of an internal combustion engine. A second fluid path 14, which may serve for ventilating the filter system 100, thus leads via the outer region 44 of the filter element 10 into the non-return valve 18 and through a bore 38 in the in the upper end plate 20, which serves as a throttle bore for setting a defined flow resistance and which is preferably designed with a size of 0.5 mm, into the fluid line 16. Air which has been entrained with the fuel from a tank system may thus be led back out of the filter system 100 by means of the non-return valve 18 and the fluid line 16 via an outlet 40. If an internal combustion engine connected to the filter system 100 is turned off, for example in start/stop operation, and as a result no fuel is resupplied from the corresponding tank system, the non-return valve 18 may thus close. The pressure in the filter element 10 is thereby maintained, and the fuel remains in the filter system 100. This provides the conditions for a rapid start of the internal combustion engine. After the re-opening of the non-return valve 18, the ventilation of the filter system 100 again begins to operate.

The filter element 10 is provided with a second end plate 21 on the side opposite the first end plate 20, wherein the fluid line 16 is connected with the second end plate 21.

Figure 2:
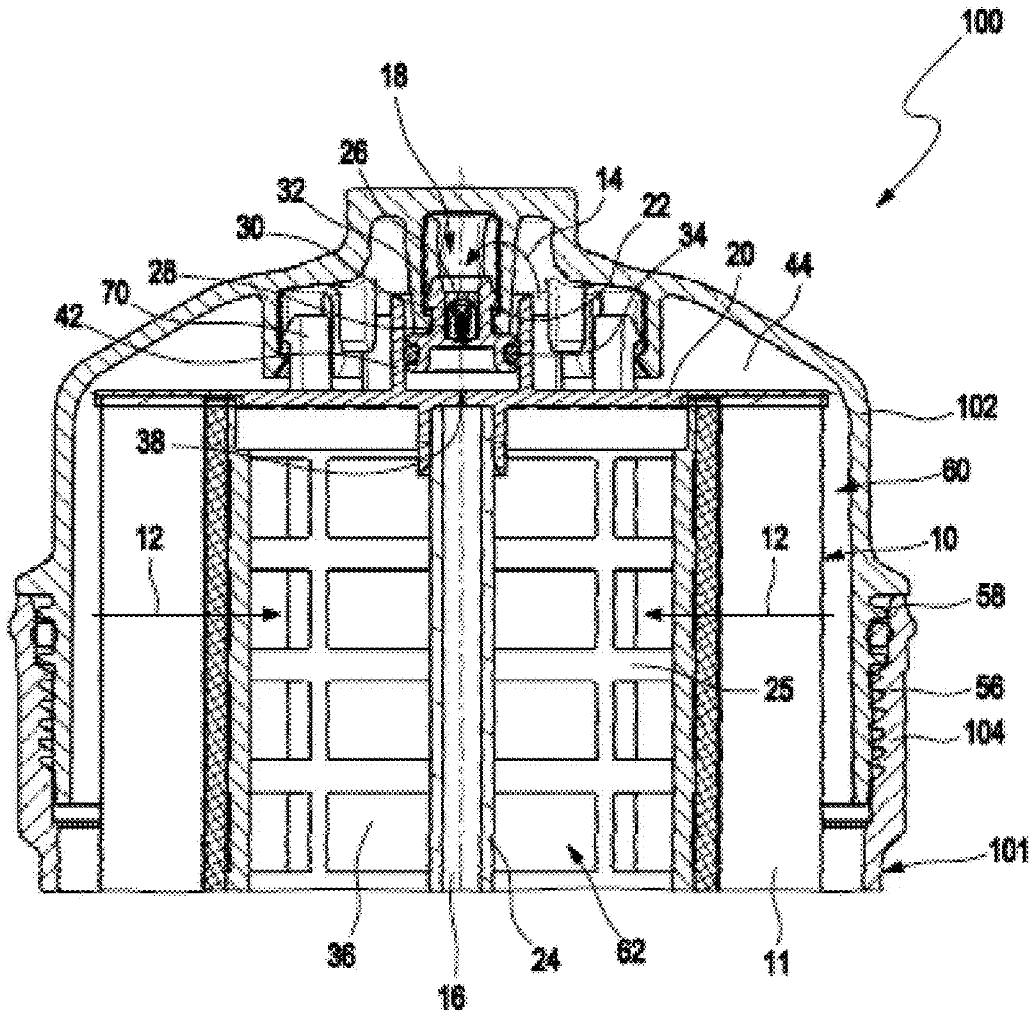
FIG. 2 shows an enlarged view of the upper part of the longitudinal section of FIG. 1 with details of the arrangement of a fluid line and a non-return valve of the filter system.

FIG. 2 shows an enlarged view of the upper part of the longitudinal section of FIG. 1 with details of the arrangement of a fluid line 16 of a non-return valve 18 in the first end plate 20 of the filter element 10. The non-return valve 18 itself is embedded with its valve body 30 in a valve support 32, for example pressed thereinto. The valve support 32, in turn, is inserted by means of an O-ring seal 34 in a corresponding receptacle 42 of the end plate 20 and thus establishes a sealed connection to the end plate 20. The valve support 32 may be fixed on the upper housing part 102 via a snap-on connection 60, so that, when the upper housing part 102 is removed, the non-return valve 18 is pulled out of the receptacle 42 of the upper end plate 20 and remains in the upper housing part 102. In cross-section, the valve body 30 displays the usual design of a non-return valve with a ball 26, which is pressed into a valve seat by means of a spring 28. The end plate 20, in turn, sits sealingly on the filter element 10 and has a connection via the bore 38 to the support tube 24 designed as the fluid line 16. The second fluid path 14 for ventilating the filter system 100 thus leads via the outer region 44 of the filter element 10 through the non-return valve 18 via the bore 38 into the support tube 24 of the filter element 10, said support tube being designed as a fluid line 16.

In FIG. 2 can also be seen the quick coupling 70, in the form of a snap connection, with which the filter element 10 is connected with the upper housing part 102 and which can be pulled out of the lower housing part 104 with said upper housing part.

Figure 3:
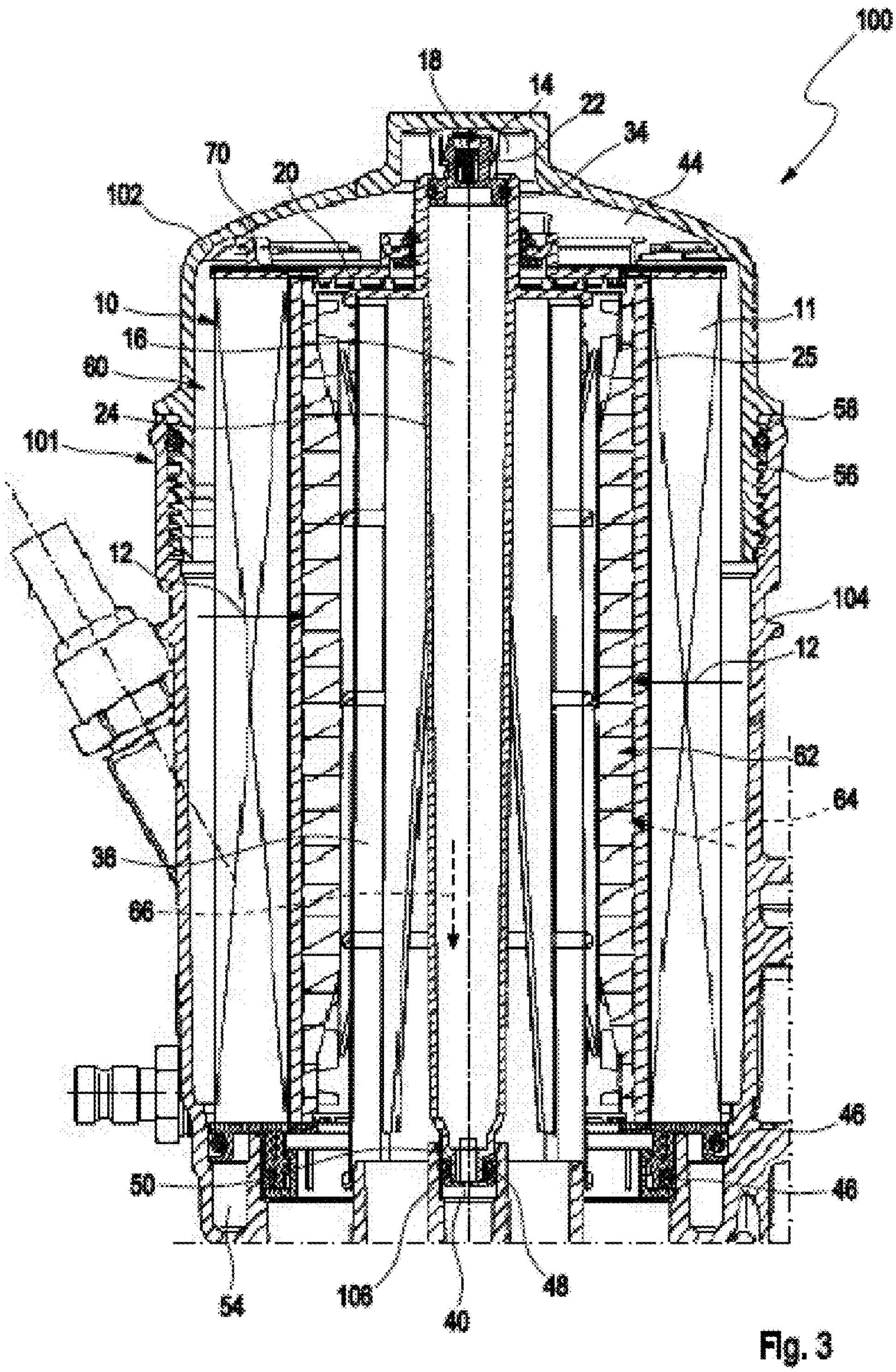
FIG. 3 shows a longitudinal section through a filter system according to another embodiment for fuel filtration in a motor vehicle with a direct arrangement of a non-return valve in a fluid line.

FIG. 3 shows a longitudinal section through a filter system 100 according to another embodiment of the invention for fuel filtration in a motor vehicle with a direct arrangement of a non-return valve 18 in a fluid line 16. The construction of the filter system 100 is similar to the filter system shown in FIG. 1 with a flow direction from the outside to the inside, which is indicated by the radial arrows from an outer region 44 into an inner region 36 through the filter element 10, i.e. from the raw side 60 into the clean side 62 of the filter system 100.

A hollow cylindrical filter element 10 is arranged in a two-part filter housing 101, wherein the filter element 10 can be designed to be replaceable. The filter system 100 can be opened for replacement, for example, via the two-part filter housing 101. The upper housing part 102 may be connected here via a screw connection 56 with the lower housing part 104, and be fixed via an inner O-ring seal 58.

The filter element 10 is connected via a quick coupling 70 in the form of a bayonet connection with the upper housing part 102, and can thus be pulled out with the unscrewed upper housing part 102 from the lower housing part 104, for example during a change of the filter element 10 for maintenance.

A first fluid path 12 shows the route of the first fluid to be filtered, for example fuel, from an outer region 44 of the filter element 10 radially through the periphery into an inner region 36, i.e. from a raw side 60 to a clean side 62 of the filter system 100. In contrast to the filter system shown in FIG. 1, however, the non-return valve 18 here is arranged directly in the fluid line 16, which in turn is formed in the support tube 24, and radially closes sealingly with the support tube 24 via an O-ring seal 34. The non-return valve 18 may be fixed on the upper housing part 102 via its valve support 32 by means of a snap connection 22. The support tube 24 is an integral component of the filter element 10 and connected to the first end plate 20. The second fluid path 14 for ventilating the filter system 100 leads in a manner analogous to FIG. 1 from the outer region 44 of the filter element 10 through the non-return valve 18 into the fluid line 16, which also opens into an outlet 40. The fluid line 16 is inserted at the lower end with an O-ring seal 48 into a receptacle 106 of the lower housing part 104. A drain device 50 is likewise mounted on the lower end of the fluid line 16, which, during a replacement of the filter element 10, protects the clean side of the tank system from contamination by separating the first 64 and second fluid 66. As in the embodiment of FIG. 1, during replacement of the filter element 10 from the lower housing part 104, the first fluid 64 still located in the raw region on the raw side 60 of the filter system 100 may drain via an emptying channel 54 and may not enter the clean side 62, i.e. the inner region 36 of the filter element 10 and thus the internal combustion engine, by means of the arrangement of the two O-ring seals 46.

Figure 4:
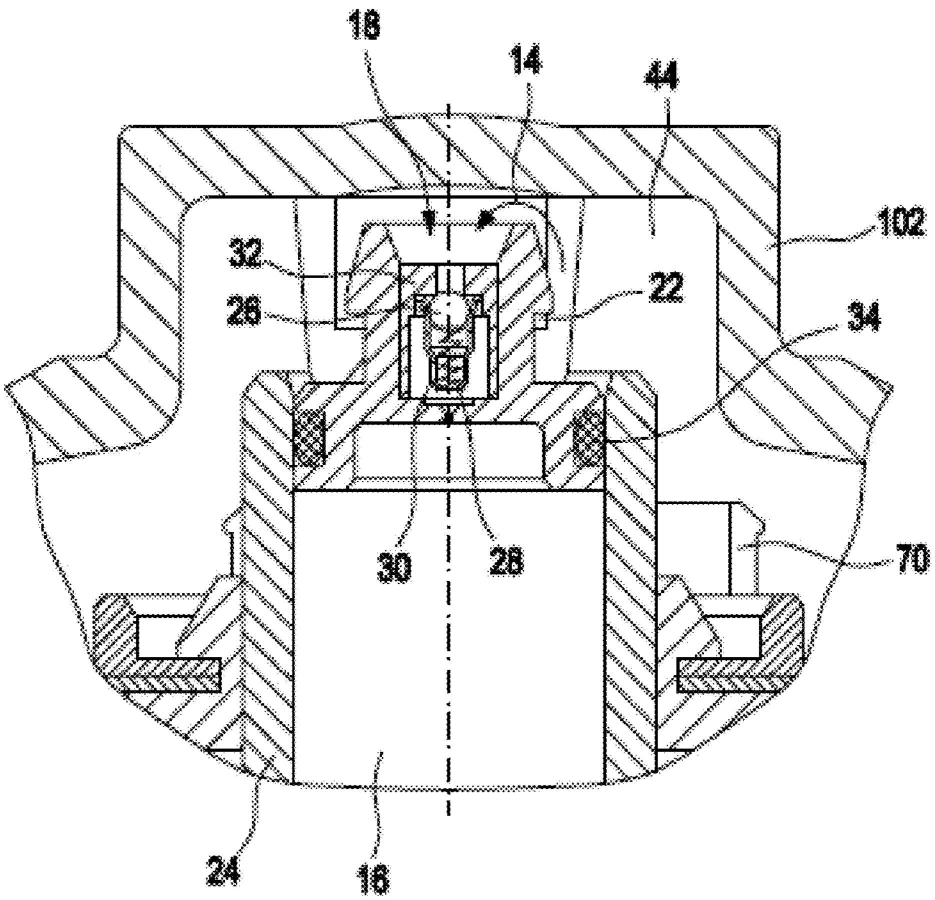
FIG. 4 shows an enlarged view of the upper part of the longitudinal section of FIG. 3 with details of the arrangement of a non-return valve for ventilation in a fluid line.

FIG. 4 shows an enlarged view of the upper part of the longitudinal section of FIG. 3 with details of the arrangement of the non-return valve 18 for ventilation in the fluid line 16. The non-return valve 18 is embedded with its valve support 32, in which the valve body 30 is arranged, directly in the fluid line 16, for example pressed thereinto, said fluid line being formed in the support tube 24 and being radially sealed with an O-ring seal 34 with respect to the filter element 10. Alternatively, the non-return valve 18 may be arranged in the upper housing part 102 and be fixed there, for example via a snap connection 22. If the upper housing part 102 is then place onto the filter element 10 which is inserted in the lower housing part 104, the non-return valve 18 may thus be pushed into the fluid line 16 formed in the support tube 24 and may be sealed via the O-ring seal 34. The second fluid path 14 for ventilating the filter system 100 thus leads in an analogous manner to the filter system shown in FIG. 1 from the outer region 44 of the filter element 10 via the non-return valve 18, the function of which is represented by a ball 26 which is pressed into a valve seat by means of a spring 28, into the support tube 24 which is formed as a fluid line 16, from where the air can be redirected back into the tank system. The manner of operation of the non-return valve 18 occurs in an analogous manner to the filter system shown in FIG. 1. If an internal combustion engine connected to the filter system 100 is turned off, for example in start/stop operation, and as a result no fuel is resupplied from a tank system, the non-return valve 18 may thus close. The pressure in the filter element 10 is thereby maintained, the fuel remains in the filter system 100. This provides the conditions for a quick start of the internal combustion engine. After re-opening of the non-return valve 18, the ventilation of the filter system 100 again begins to operate.

Figure 5:
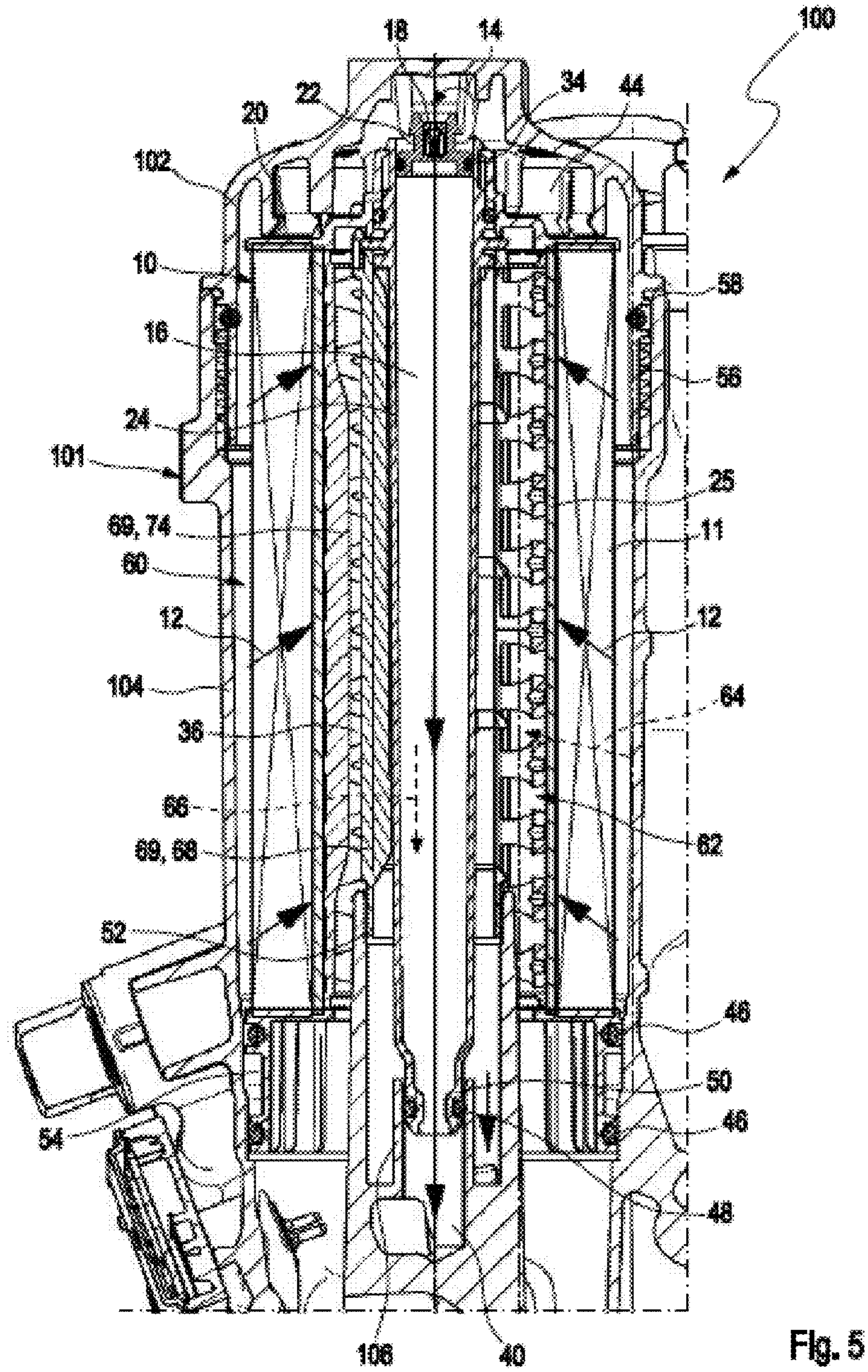
FIG. 5 shows a longitudinal section through a filter system according to a further embodiment for fuel filtration in a motor vehicle with two O-rings for sealing a filter element against a filter housing.

FIG. 5 shows a longitudinal section through a filter system 100 according to a further embodiment of the invention for fuel filtration in a motor vehicle with two O-rings 46 for sealing a filter element 10 against a filter housing 101. The construction of the filter system 100 is similar to the filter system shown in FIG. 3 with a flow direction from the outside to the inside, which is indicated by arrows from an inner region 44 into an inner region 36 in the filter element 10, i.e. from a raw side 60 to a clean side 62 of the filter system, and differs from the embodiment shown in FIG. 3 in that the receptacle of the filter element is designed differently in the lower housing part 104. The filter element 10 has two O-ring seals 46 of the same diameter which sealingly close an emptying channel 54. During replacement of the filter element 10, i.e. when the filter element 10 is pulled out of the lower housing part 104, the first fluid 64 which is still in the outer region 44 may drain by means of this emptying channel 54, so that it does not enter the clean side 62, i.e. the inner region 36 of the filter element 10 and thus into the internal combustion engine.

As in the embodiment shown in FIG. 1, the filter element 10 is connected via a quick coupling 70 in the form of a snap connection with the upper housing part 102, and can thus be pulled out with the unscrewed upper housing part 102 from the lower housing part 104, for example during a change of the filter element 10 for maintenance.

The other functional behavior of the filter system 100 according to the embodiment shown in FIG. 5 corresponds to the embodiment shown in FIG. 3. Here, too, the fluid line 16 is inserted at the lower end with an O-ring seal 48 into a receptacle 106 of the lower housing part 104. A drain device 50 is likewise mounted on the lower end of the fluid line 16, which, during a replacement of the filter element 10, protects the clean side of the tank system from contamination by separating the first and second fluid.

A water separating device 69 can be seen coaxially to the support tube 24, which comprises a coalescer 74, which is arranged concentrically about the fluid line 16 on a clean side 62 of the filter element 10, as well as an end separator 68, which is arranged concentrically about the fluid line 16 between the coalescer 74 and the fluid line 16. The end separator 68 has a sealing lip 52 on the lower end for connecting to an outlet, via which separated water can be fed into a water collection chamber. The end separator 68 is supported by lying against the support tube 24, which is used for ventilating the filter element 10.

Figure 6:
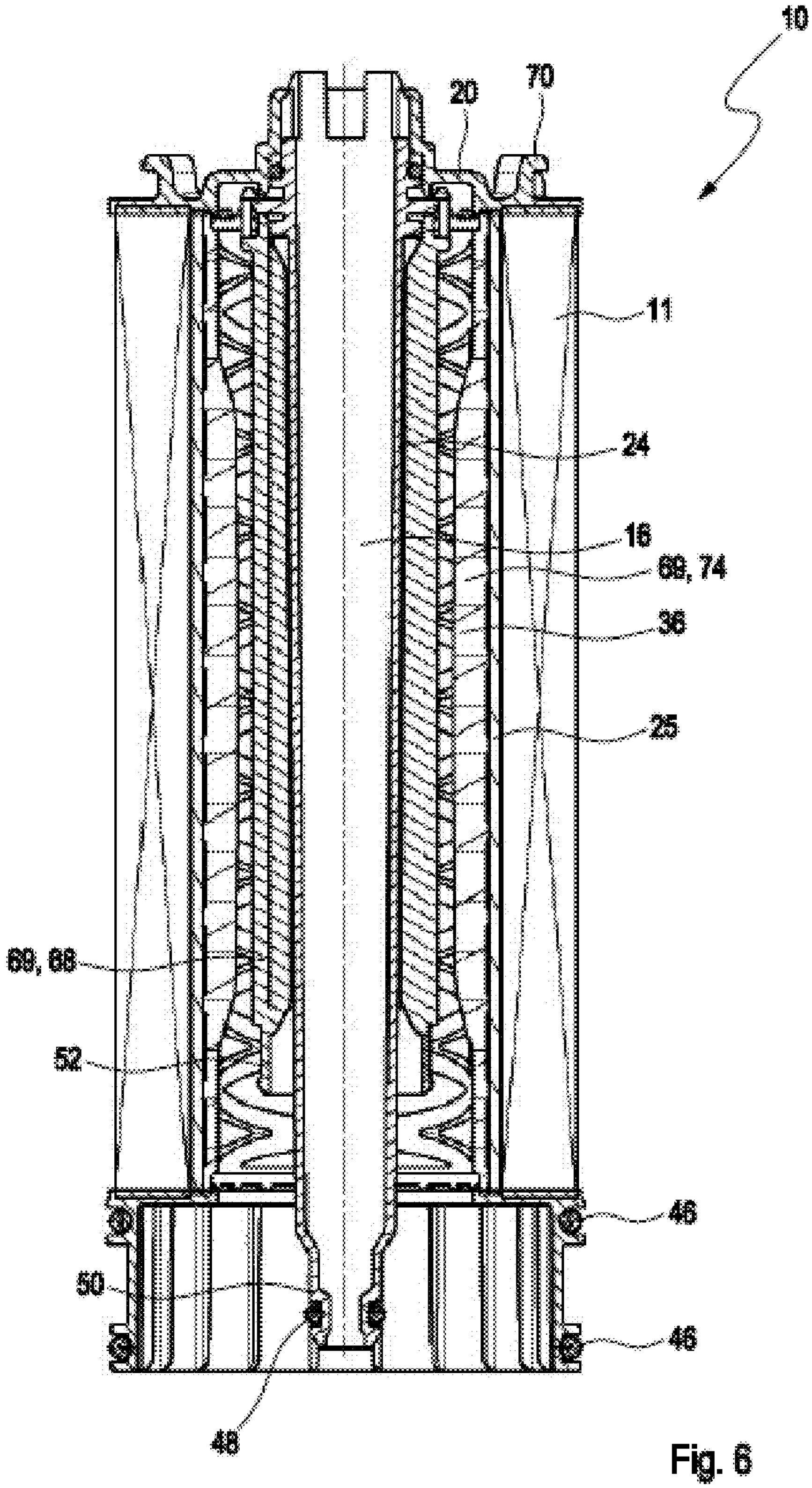
FIG. 6 shows a longitudinal section through a filter element with a water separating function, as can be used in the filter system represented in FIG. 5.

FIG. 6 shows a longitudinal section through a filter element 10 with a water separating function, as can be used in the filter system 100 represented in FIG. 5. The filter element 10, which has a first end plate 20 as an upper closure, is stiffened by means of a central support tube 24, which acts as the fluid line 16. The support tube 24 has an O-ring seal 48 on the lower end for sealing when inserted into a filter housing 101, as well as a drain device 50 for separating the first 64 and second fluid 66 when the filter element 10 is changed and thus removed from the filter housing 101. The sealing of the filter element 10 itself to the filter housing 101 occurs via two O-ring seals 46 of the same diameter, which are used to separate the raw side 60 and the clean side 62 of the filter element 10 during replacement through draining of the first fluid 64 still located on the raw side 60 by means of an emptying channel 54. A water separating device 69 can be seen coaxially to the support tube 24, which comprises a coalescer 74 as well as an end separator 68, which has a sealing lip 52 on the lower end for connecting to an outlet, via which separated water can be separately led into a collection chamber. The end separator 68 is supported by lying against the support tube 24. The end plate 20 carried bayonet elements of a quick coupling 70 for connecting the filter element 10 with the upper housing part 102.

Figure 7:
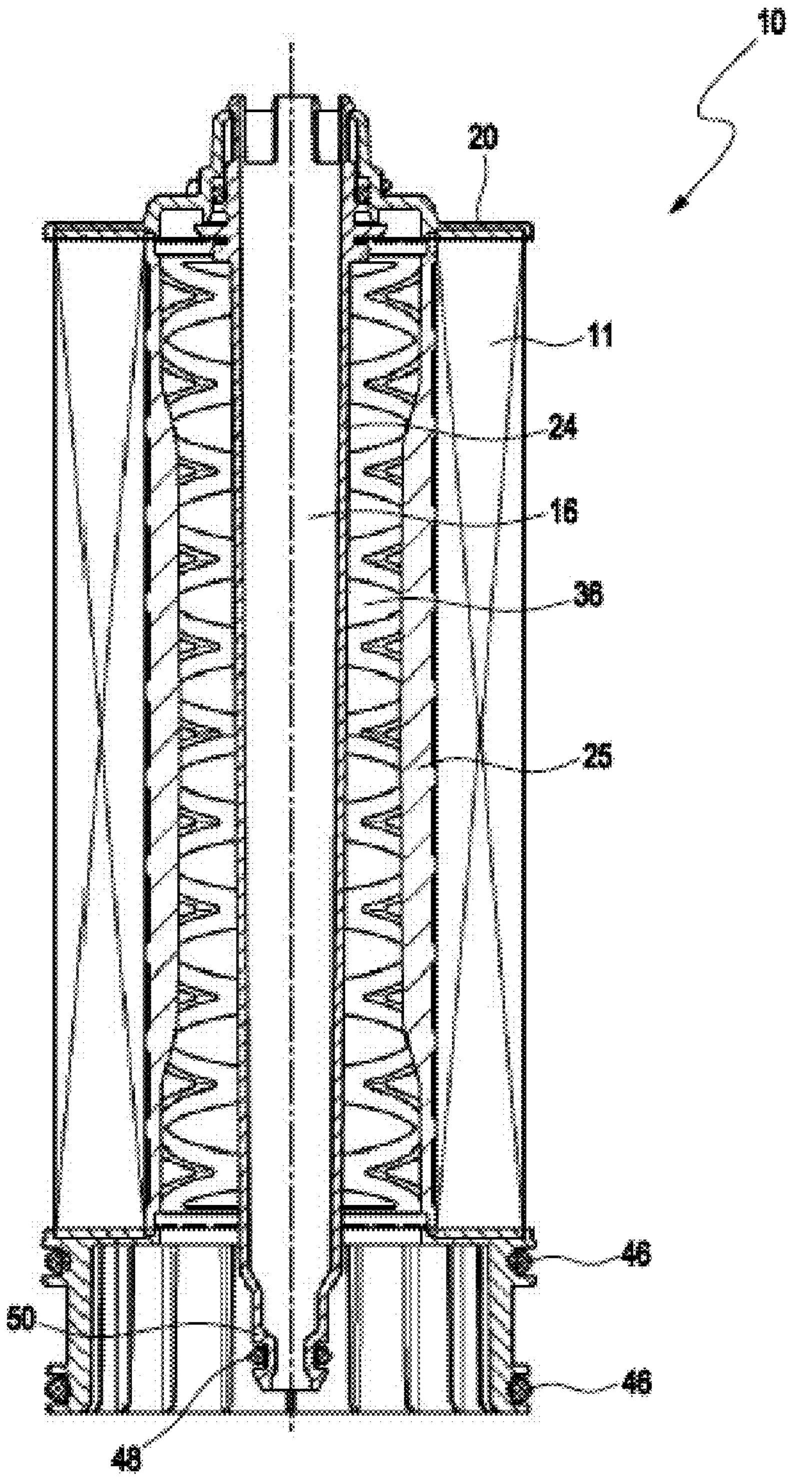
FIG. 7 shows a longitudinal section through a filter element without a water separating function, as can be used in the filter system represented in FIG. 5.

FIG. 7 shows a longitudinal section through a filter element 10 without a water separating function, as can be used in the filter system 100 represented in FIG. 5. The filter element 10 has the same features as the filter element 10 shown in FIG. 6, except for the missing water separating device 69 for water separation, so that reference is made to the figures in question for the sake of avoiding unnecessary repetition.

Figure 8:
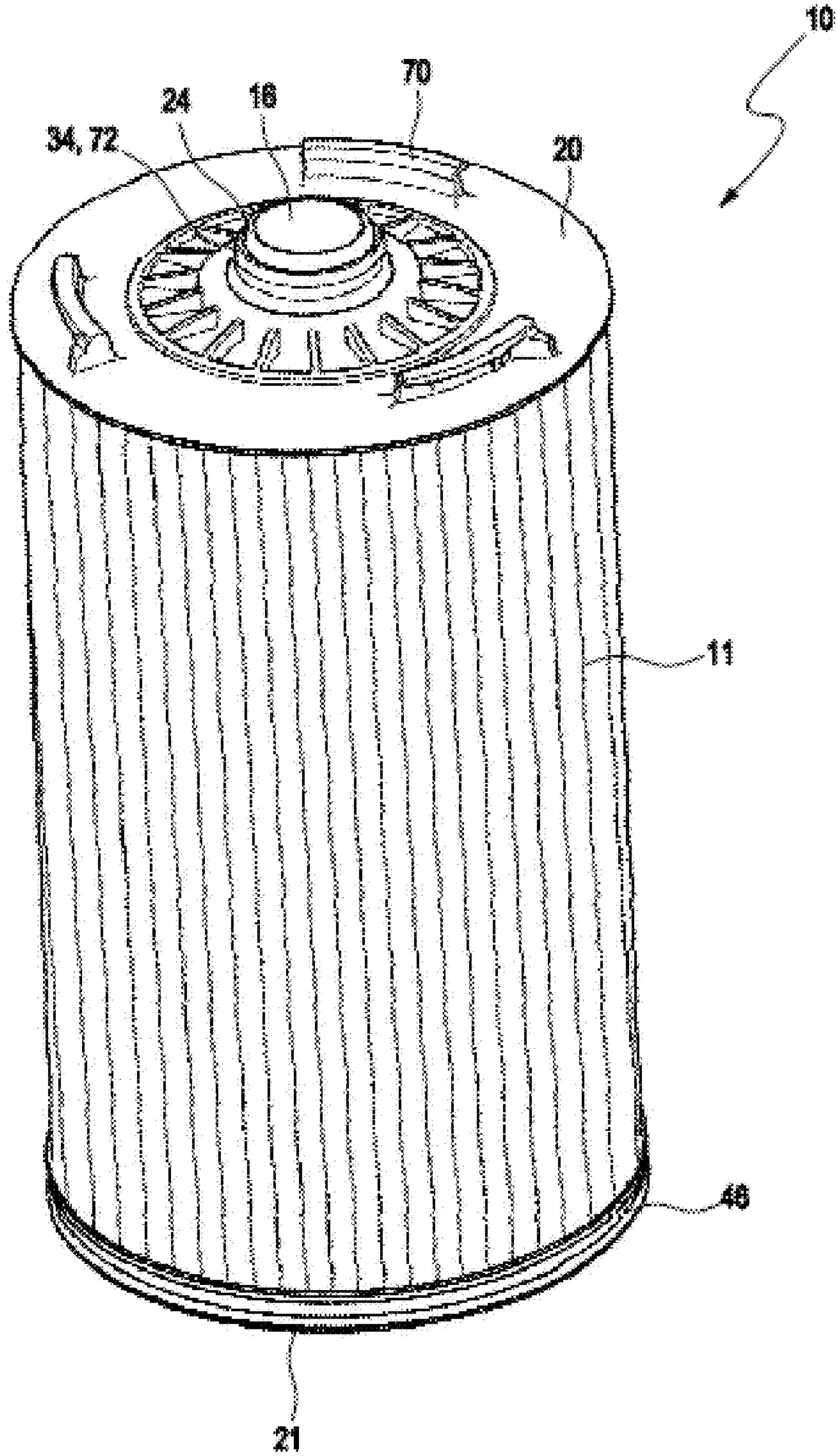
FIG. 8 shows an isometric representation of a filter element with a quick coupling according to another embodiment of the invention.

FIG. 8 shows an isometric representation of a filter element 10 with a quick coupling 70 according to another embodiment of the invention. On the upper end plate 20, the filter element 10 has connecting elements of a quick coupling 70, which are designed in the form of bayonet hooks. With these bayonet hooks, a quick and secure connection can be made to an upper housing part 102, on which the filter element 10 can also be removed from the lower housing part 104 during a replacement of the filter element 10, for example for maintenance purposes. A support tube 24 as a fluid line 16 extends centrally beyond the upper end plate 20 of the filter element 10, said support tube having a seal 34 at its upper edge in the form of a molded seal 72, which is arranged sealingly about the support tube 34. The lower end plate 21, which closes the filter body 11 downward, has a seal 46 at its outer periphery for separating a clean side 62 and a raw side 60 of the filter element 10 during installation in a filter housing 101.

Figure 9:
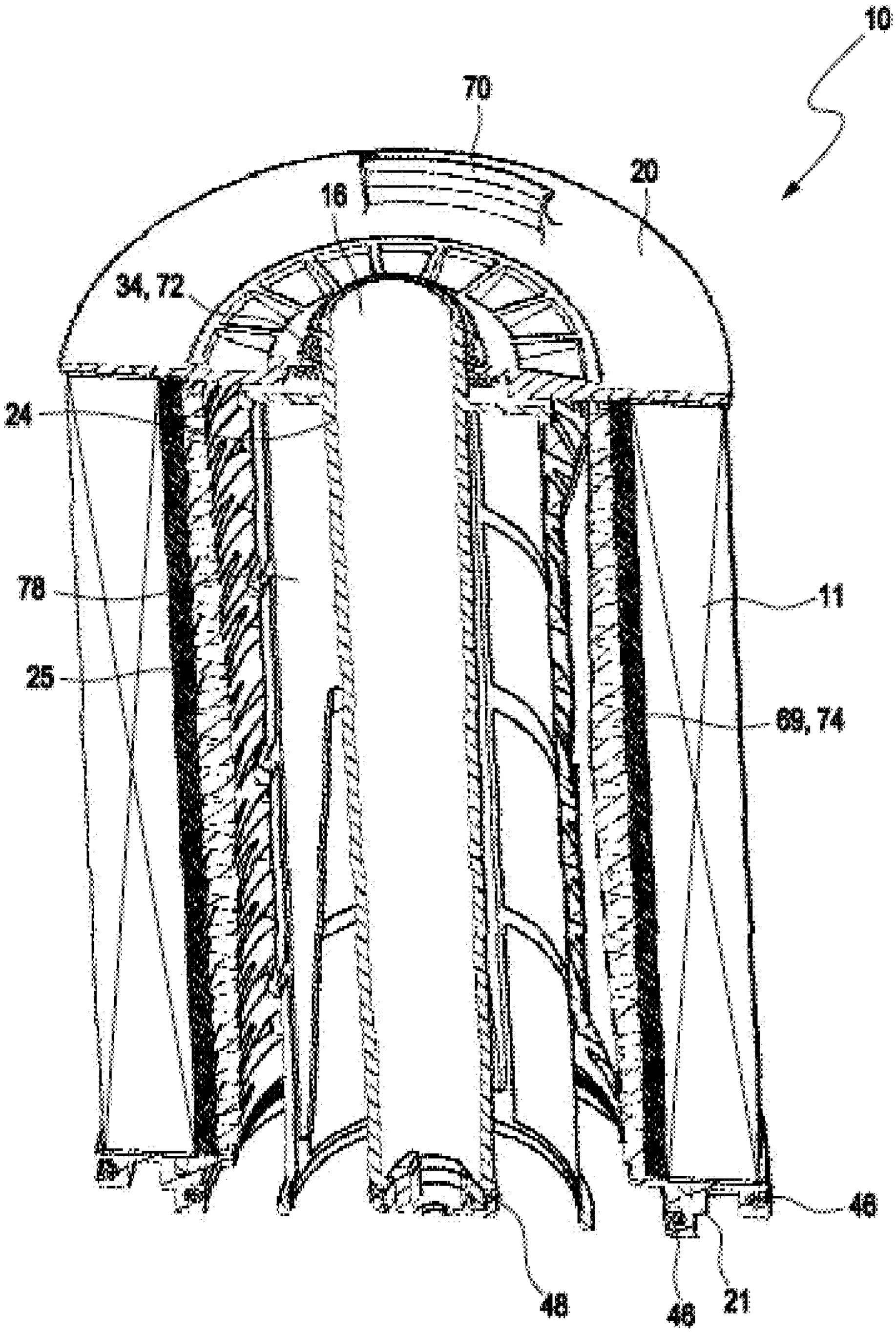
FIG. 9 shows a section through a filter element according to FIG. 8.

FIG. 9 shows a section through the filter element 10 as shown in FIG. 8. It can be seen in the sectional view that the seal 46 at the lower end plate 21 comprises two individual seals 46 in the form of O-rings, which seal the filter body 11 on its outside and inside, and thus separate the raw side 60 from the clean side 62 of the filter element. The inside of the filter body 11 is supported by a central tube 25, which in turn supports a coalescer 74 of a water separating device 69 on its inside. The separation of the coagulated water drops then occurs at the end separator 68 of the water separating device 69 (see FIG. 11), which is arranged concentrically about the support tube 16 and is connected therewith by means of a stiffening rib 78. The molded seal 72 at the upper end of the support tube 16 can also clearly be seen in the section, which molded seal remains on the filter element 10 during replacement thereof and is thus also exchanged with the filter element 10.

Figure 10:
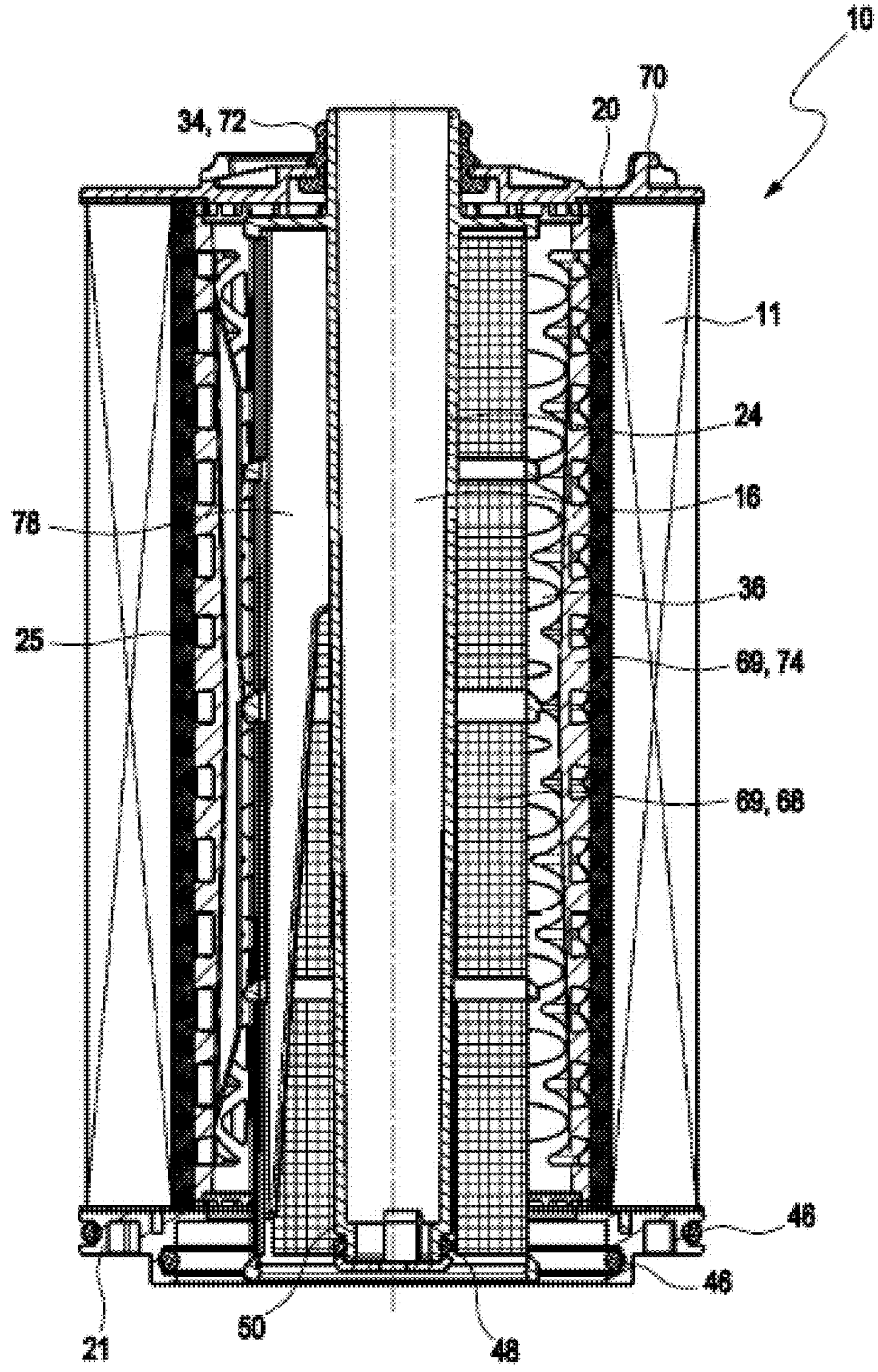
FIG. 10 shows a longitudinal section through a filter element with a water separating function according to a further embodiment of the invention.

FIG. 10 shows a longitudinal section through a filter element 10 with a water separating function according to a further embodiment of the invention and corresponds to the isometric representation of FIG. 9.

Figure 11:
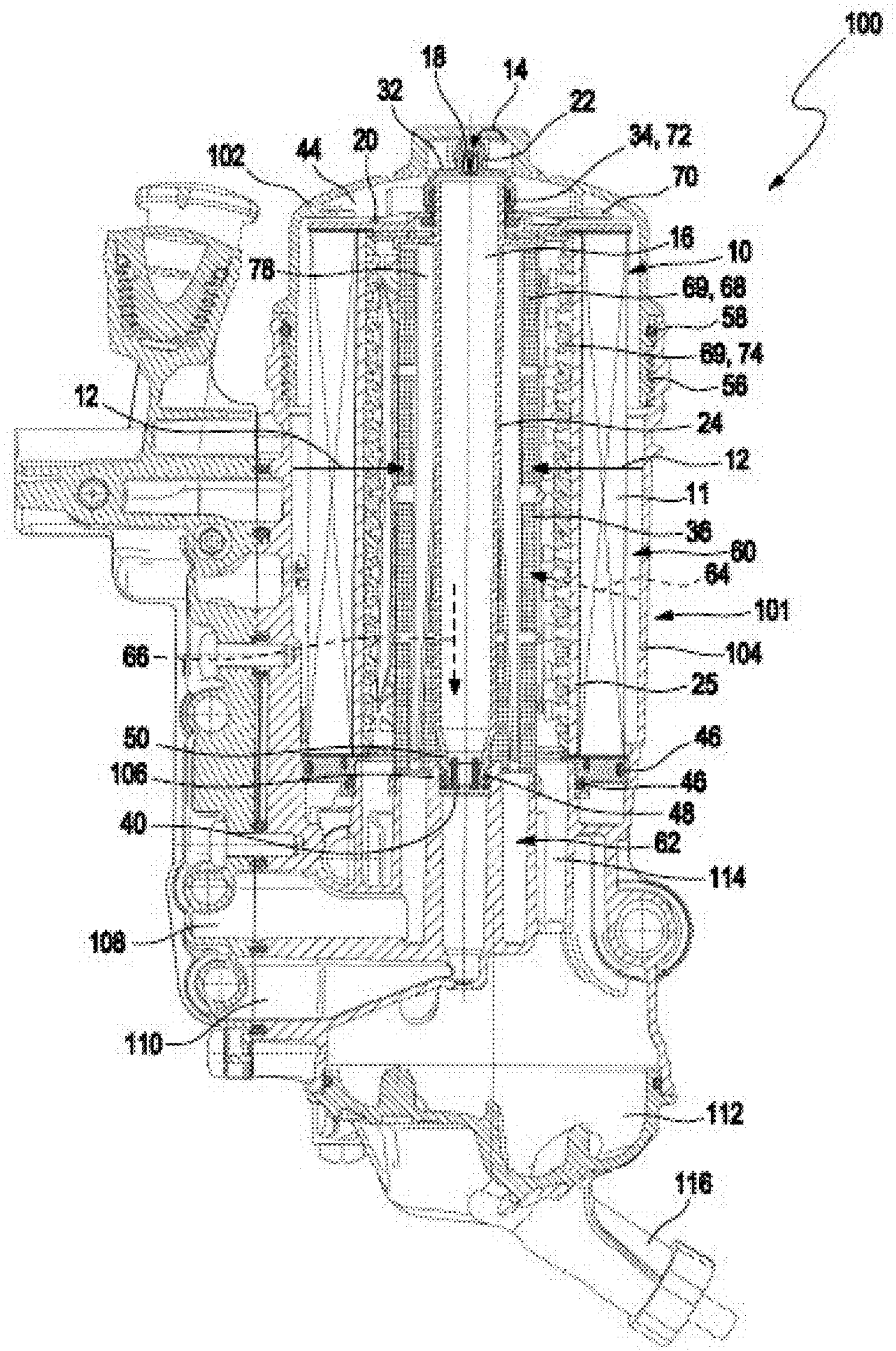
FIG. 11 shows a longitudinal section through a filter system with a water separating function according to a further embodiment of the invention.

FIG. 11 shows a longitudinal section through a filter system 100 with a water separating function according to a further embodiment of the invention. The construction of the filter system 100 is similar to the filter system shown in FIG. 5 with a flow direction from the outside to the inside, which is indicated by arrows from an inner region 44 into an inner region 36 in the filter element 10, i.e. from a raw side 60 to a clean side 62 of the filter system, and differs from the embodiment shown in FIG. 3 in that the receptacle of the filter element is designed differently in the lower housing part 104.

On its lower end plate 21, the filter element 10 has two O-ring seals 46 which seal the filter body 11 respectively on its outside and inside and thus separate the raw side 60 from the clean side 62. During replacement of the filter element 10, i.e. when the filter element 10 is pulled out of the lower housing part 104, the first fluid 64 which is still in the outer region 44 may drain by means of an emptying channel 54, so that it does not enter the clean side 62, i.e. the inner region 36 of the filter element 10 and thus into the internal combustion engine. The filter element 10 is connected via a quick coupling 70 in the form of a bayonet connection with the upper housing part 102, and can thus be removed from the lower housing part 104 with the upper housing part 102 during replacement of the filter element 10 for maintenance purposes. The non-return valve 18 of the second fluid path 14 is seated in the valve support 32, which is connected in turn via a snap connection 22 with the upper housing part 102. In contrast to the other embodiments illustrated in FIGS. 1, 3, 5, the valve support 32 is bell-shaped and can thus slide over the molded seal 72, so as to seal the second fluid path 14 of the fluid line 16, which is formed in the support tube 24. When changing the filter element 10, this can be pulled out with the upper housing part 102. Here, the valve support 32 remains with the non-return valve 18 on the molded seal 72. When the filter element 10 is completely removed from the lower housing part 104, the upper housing part 102 can be removed via the quick coupling 70 with the valve support 32 and the non-return valve 18 arranged therein can be withdrawn from the filter element 10. Here, the valve support 32 is also withdrawn from the molded seal 72, which remains in this case on the support tube 24. When a new filter element 10 is inserted, a new molded seal 72 is thus also used.

The other functional behavior of the filter system 100 according to the embodiment shown in FIG. 5 corresponds to the embodiment shown in FIG. 5. Here, too, the fluid line 16 is inserted at the lower end with an O-ring seal 48 into a receptacle 106 of the lower housing part 104. A drain device 50 is likewise mounted on the lower end of the fluid line 16, which, during a replacement of the filter element 10, protects the clean side of the tank system from contamination by separating the first and second fluid.

A water separating device 69 can be seen coaxially to the support tube 24, which comprises a coalescer 74, which is arranged concentrically about the fluid line 16 on a clean side 62 of the filter element 10, as well as an end separator 68, which is arranged concentrically about the fluid line 16 between the coalescer 74 and the fluid line 16. The end separator 68 is supported via the stiffening element 78 by lying against the support tube 24, which is used for ventilating the filter element 10. The separated water passes through a water drain 114 into a water collection chamber 112, from where it can be discharged via an outlet 116.

The clean side 62 of the filter element 10 opens into an outlet 108, from where the filtered fluid 64 can be conducted into an internal combustion engine. The fluid line 16 opens into an outlet 110, which can be fed back into a tank space.

Figure 12:
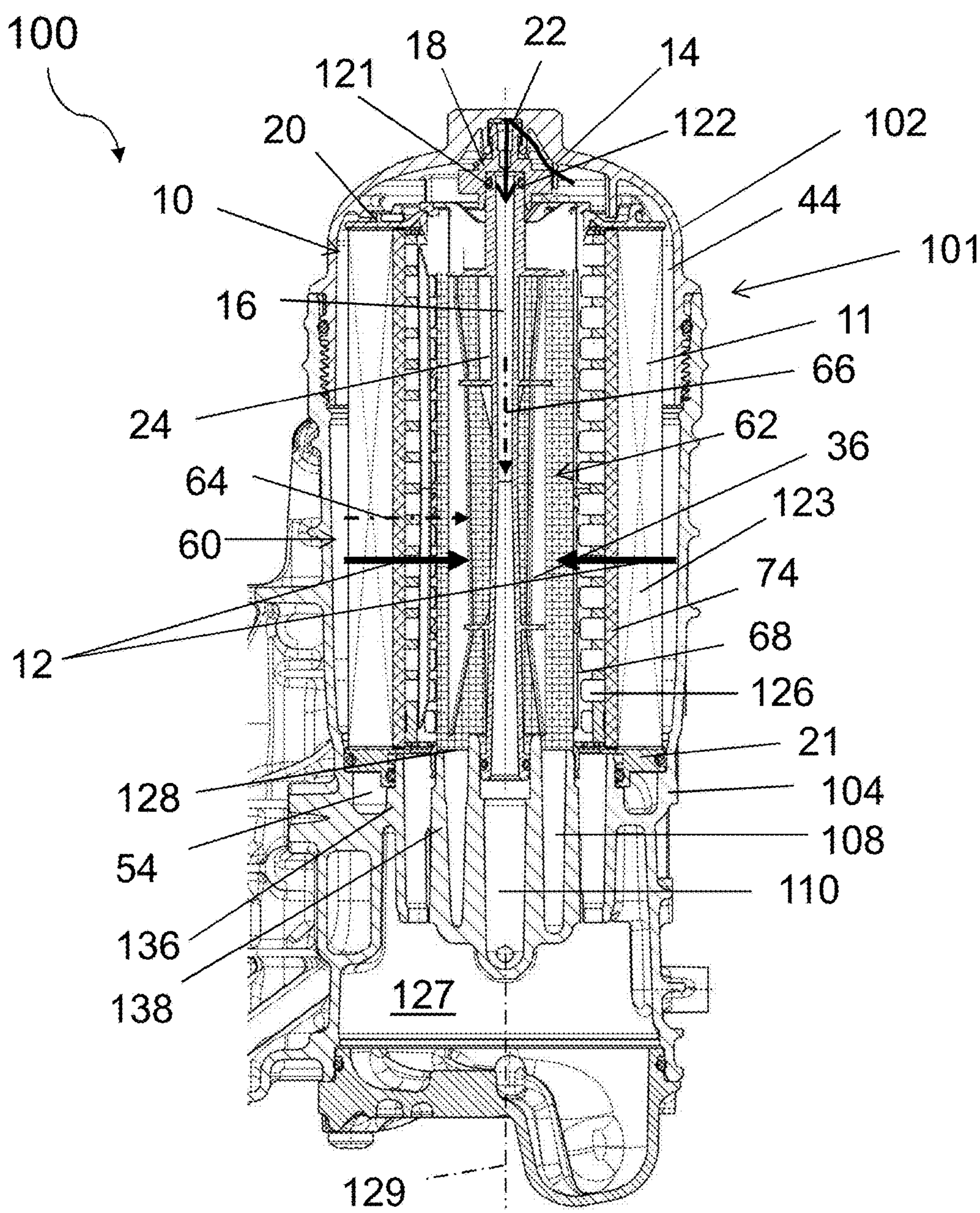
FIG. 12 shows a longitudinal section through a filter system according to a further embodiment for fuel filtration in a motor vehicle with an arrangement of a non-return valve on a housing cover.

FIG. 12 shows a longitudinal section through a filter system 100 according to a further embodiment for fuel filtration in a motor vehicle with an arrangement of a non-return valve 18 on a housing cover 102. In general, the functional behavior of the filter system 100 according to the embodiment shown in FIG. 12 corresponds to the embodiments shown in the preceding figures. A replaceable filter element 10 is arranged in the housing 101 of the filter system 100. A first fluid path 12 shows the route of the first fluid 64 to be filtered, for example fuel, from an outer region 44 of the filter element 10 (raw side 60) radially through a filter body 11 of the filter element 10 into an inner region 36 (clean side 62). The non-return valve 18 is arranged above the filter body 11 of the filter element 10 and is fixed on the housing cover 102 by means of a snap connection 22. The non-return valve 18 has a receptacle 121 for an element-side non-return valve port 122. The second fluid path 14 for ventilating the filter system 100 leads from the outer region 44 of the filter element 10 through the non-return valve 18 into the fluid line 16 fixed to the element, which opens into an outlet 40 in the form of a housing-side outflow channel. In particular, the manner of function of the non-return valve 18 corresponds to that of the already-described embodiments.

The fluid line 16 is part of the replaceable filter element 10. It extends from the end face of the filter element 10, which is arranged above in the installed state, to the opposite, lower end face through the inner region 36 surrounded by the filter body 11.

The filter body 11 has a star-folded filter media web, which is used for particle filtration. A wound coalescer 74 is likewise provided within the star-folded filter media web. A water separating element 68, for example with a hydrophobic mesh fabric, in turn follows the coalescer 74 in the direction of flow, which water separating element is however arranged for example within the coalescer 74 and at the height thereof. An annular water discharge gap 126 is formed between the coalescer medium 74 and the water separating element 68. The annular water discharge gap 126 is connected below with a water collection area 112 of the filter system 100. The inner region 36 surrounded by the water separating element 68 is provided on the lower end face with a clean fuel outlet 128.

Figure 13:
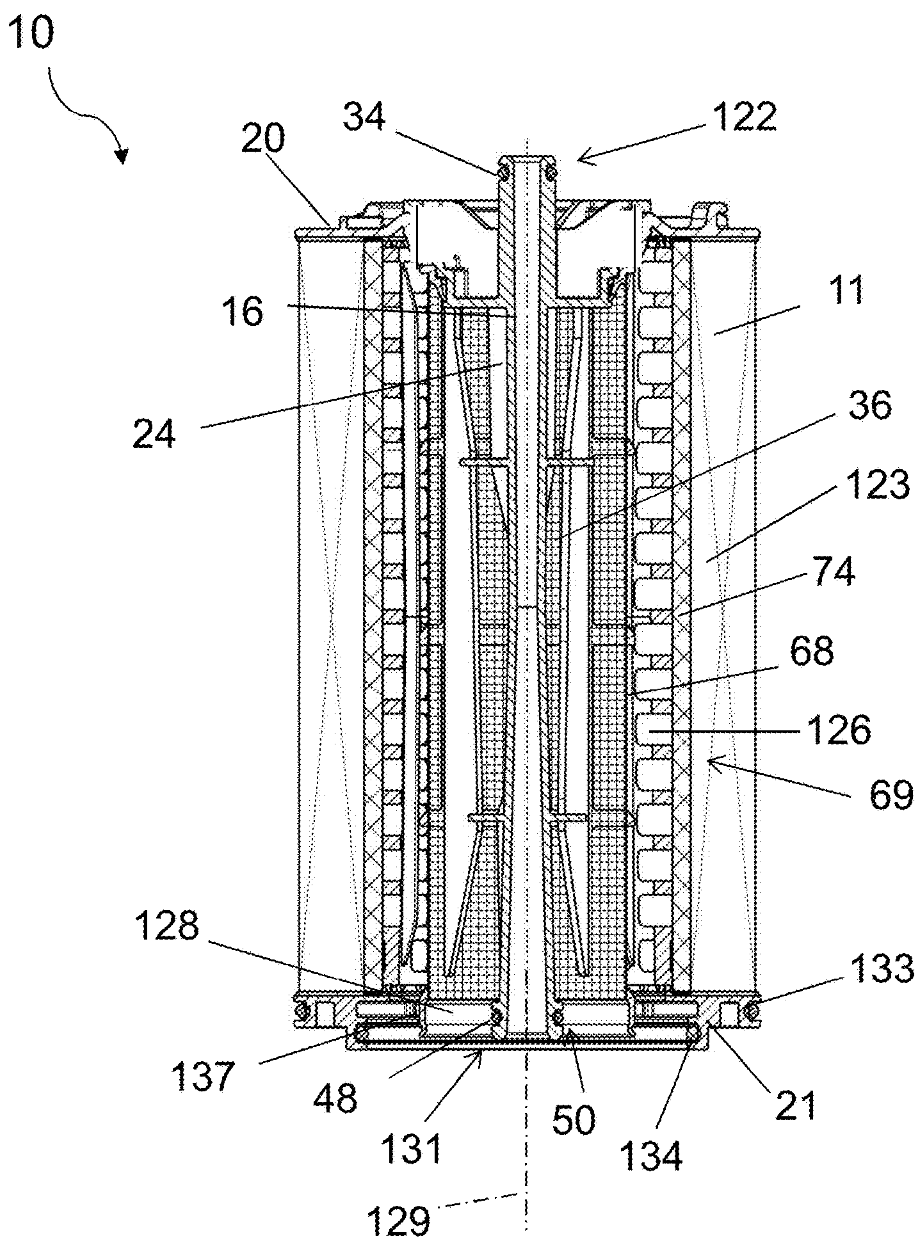
FIG. 13 shows a longitudinal section through the filter element of the filter system according to FIG. 12.

In FIG. 13, the filter element 10 of the filter system 100 according to FIG. 12 is shown in isolation. The non-return valve port 122 is formed as a stub-shaped protrusion of the fluid line 16, which protrudes on the upper end face of the filter element 10 and is arranged coaxially to the longitudinal element axis 129. It is provided with a seal oriented radially outward in the form of an applied O-ring 34 for sealing against the non-return valve 18.

The filter element 10 comprises an outflow port 131 on the lower end face, by means of which the fluid line 16 can be connected to the discharge 110 during installation of the filter element 10 in the housing 101 of the filter system 100. The outflow port 131 is also designed as a stub-shaped protrusion of the fluid line 16, which is arranged coaxially to the longitudinal element axis 129. It has a circumferential seal which is oriented radially outward in the form of an applied O-ring 48. A drain device 50 is likewise mounted on the lower end of the fluid line 16, which, during a replacement of the filter element 10, protects the clean side 62 of the tank system from contamination by separating the first 64 and second fluid 66.

In addition, the filter element 10 has two circumferential seals 133, 134 on the lower end face, wherein the seal 133 is oriented radially outward and the seal 134 is oriented radially inward. The seal 133 abuts against the inner housing wall and is used for sealing the outer annular space 44 from an emptying area 54 formed as a groove (FIG. 12). The other seal 134 abuts against a housing stub 136 and is used for sealing the water collection area 127 against the emptying area 135. The element-side clean fuel outlet 128 is surrounded by a stub-shaped protrusion 137, which additionally surrounds the outflow pot 131 and is mounted on a housing-side stub 138, which encloses an annular channel of the fuel outlet 108.

Figure 14:
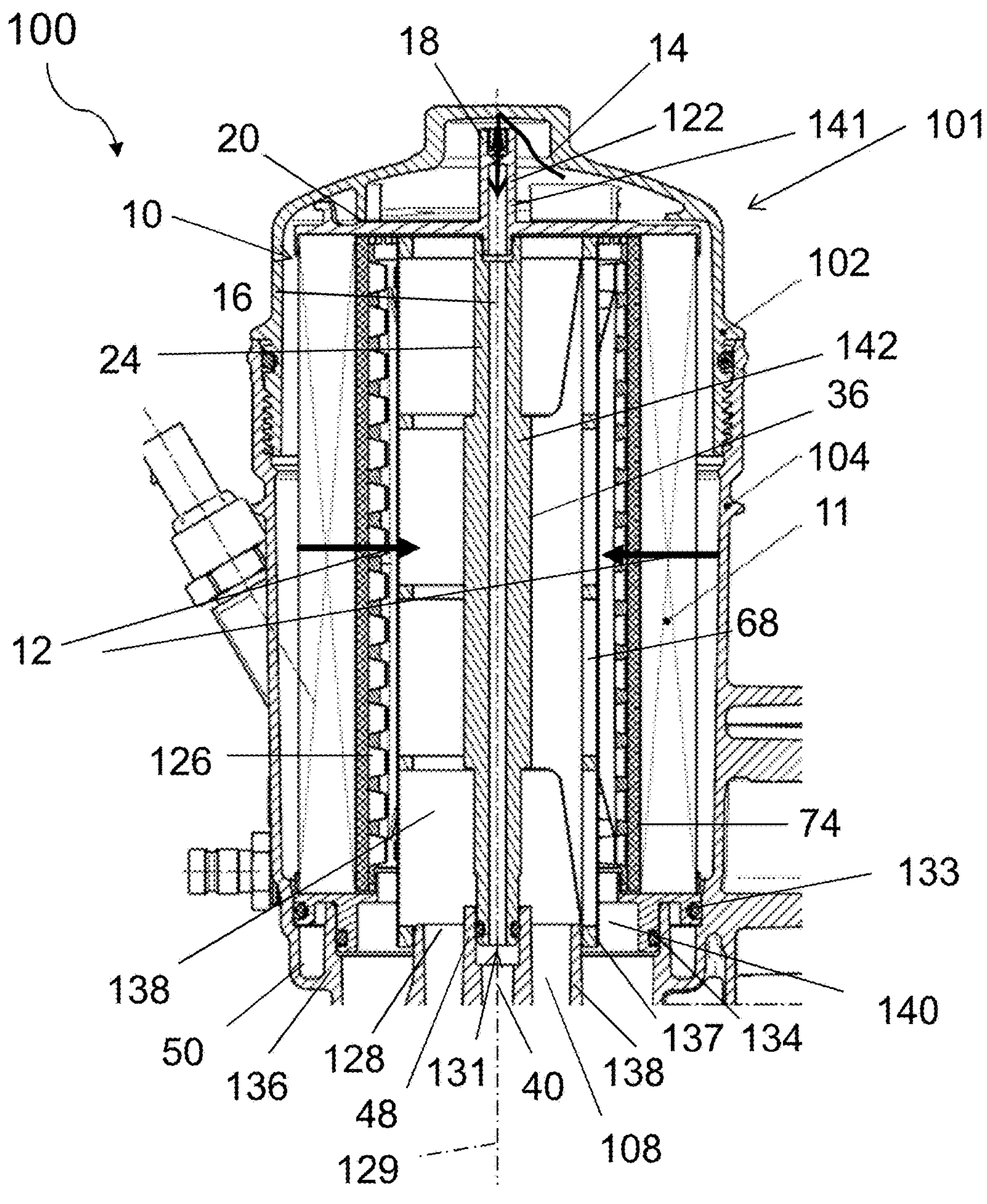
FIG. 14 shows a longitudinal section through a filter system according to a further embodiment for fuel filtration in a motor vehicle with an arrangement of a non-return valve in the fluid line fixed to the element.

FIG. 14 shows a longitudinal section through a filter system 100 according to a further embodiment of the invention for fuel filtration in a motor vehicle with an arrangement of a non-return valve 18 in the fluid line 16 fixed to the element. The fluid line 16 is formed in this example from a section 141 provided through the end plate 20 of the filter element 10 and a section 142 extending in the inner region of the filter media body 119. As in the example according to FIG. 12, the fluid line 16 is exchanged together with the filter element 10, wherein at the same time the non-return valve 18 integrated in section 141 is also exchanged. The filter system 100 according to FIG. 14 is similar to the other embodiments in construction and function, so that reference is made in general to the preceding descriptions, wherein advantageous differences also arise from FIG. 14.

What is claimed is:

1. A filter element, including:

a hollow filter media body consisting of:

a filter media for filtering a fluid, the filter media circumferentially surrounding and closed circumferentially about a longitudinal element axis and having an open interior region (36) concentric with and arranged on the longitudinal element axis;

wherein axial, as used herein, is a direction parallel to the longitudinal element axis;

wherein radial, as used herein, is a direction transverse to the longitudinal element axis;

the hollow filter media body of filter media, having:

a radially outer surface of the filter media of the hollow filter media body forming an inflow face;

a radially inner surface of the filter media, within the open interior region (36) of the hollow filter media body, forming an outflow face;

a first axial end of the filter media hollow body; and an opposite second axial end of the filter media hollow body;

the filter element including:

a first end plate (20) arranged directly on the first axial end of the filter media hollow body;

a second end plate (21) arranged directly on the opposite second axial end of the filter media hollow body, the filter media extending continuously from the first end plate to the second end plate;

an air outflow fluid line (16) formed as a tube and connected to the first end plate, the air outflow fluid line (16) extending axially through an opening in the second end plate into the open interior region of the hollow filter media body; and wherein the air outflow fluid line (16) is securely connected to the first end plate.

2. The filter element according to claim 1, wherein the air outflow fluid line (16) extends from the first axial end of the filter media hollow body to the opposite second axial end of the filter media hollow body through the open interior region (36) and circumferentially surrounded by the hollow filter media body.

3. The filter element according to claim 1, wherein the filter element (10) has an inflow port (122), by means of which the fluid line (16) can be connected to a non-return valve (18), and/or throttle unit during installation of the filter element (10) in a housing (101) of a filter system (100);

wherein the inflow port (122) is a stub-shaped protrusion of the air outflow fluid line (16), which protrudes outwardly from an end face of the filter element (10) and/or is arranged coaxially to a longitudinal element axis (129) of the filter element.

4. The filter element according to claim 3, wherein the inflow port (122) has a seal ring (34) for sealing engagement with a valve, the non-return valve (18) and/or throttle unit.

5. The filter element according to claim 1, wherein the filter element has an air outflow port (131), by means of which the air outflow fluid line (16) can be connected to a housing-side outflow channel (40) during installation of the filter element (10) in a housing (101) of a filter system (100).

6. The filter element according to claim 5, wherein the air outflow port (131) is formed as a stub-shaped protrusion on the air outflow fluid line (16) arranged coaxially to the longitudinal element axis (129).

7. The filter element according to claim 6, wherein the air outflow port (131) has a seal ring (48) configured for sealing engagement to a housing-side outflow channel during installation of the filter element (10) in a housing (101).

8. The filter element according to claim 6, wherein the filter element has two circumferential seals (133, 134) in the region of the end face which is below in the installed filter element (10);

wherein one of the seals (133) or both seals are oriented radially outward and/or one of the seals (134) or both of the seals are oriented radially inward.

9. The filter element according to claim 6, wherein the stub-shaped protrusion of the air outflow fluid line (16) forms a drain device (50) with a receptacle of the housing, the drain device (50) opening during disassembly of the filter element from the housing (101).

10. A filter system, including a filter housing (101);

a filter element according to claim 1 replaceably arranged in a filter housing (101);

wherein the filter system (100) includes a receptacle (106) for the air outflow fluid line (16) and/or a receptacle (42) for a non-return valve (18).

11. The filter system according to claim 10, wherein the air outflow fluid line (16) of the filter element is provided for ventilating a fuel management system of an internal combustion engine.

12. The filter system according to claim 10, wherein the non-return valve (18) is attached to an interior side of an upper housing part (102) of the filter housing (101).

13. The filter system according to claim 12, wherein the non-return valve (18) is arranged above the filter body (11) of the filter element (10).

* * * * *